US012361863B2

(12) United States Patent
Kim et al.

(10) Patent No.: US 12,361,863 B2
(45) Date of Patent: Jul. 15, 2025

(54) DISPLAY DEVICE, DRIVING METHOD THEREOF, AND ELECTRONIC DEVICE USING THE SAME

(71) Applicant: SAMSUNG DISPLAY CO., LTD., Yongin-si (KR)

(72) Inventors: Min Woo Kim, Yongin-si (KR); Jong Rea Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/400,628

(22) Filed: Dec. 29, 2023

(65) Prior Publication Data

US 2024/0282245 A1 Aug. 22, 2024

(30) Foreign Application Priority Data

Feb. 16, 2023 (KR) ........................ 10-2023-0020824

(51) Int. Cl.
*G09G 3/32* (2016.01)

(52) U.S. Cl.
CPC ....... *G09G 3/32* (2013.01); *G09G 2310/0275* (2013.01); *G09G 2310/08* (2013.01)

(58) Field of Classification Search
CPC ............ G09G 3/32; G09G 3/20; G09G 5/008; G09G 2310/0275; G09G 2310/08; G09G 2310/027; G09G 2330/06; G09G 2310/0243; G09G 2310/0264; H03L 7/089; H03L 7/093; H03L 7/18
See application file for complete search history.

(56) References Cited

U.S. PATENT DOCUMENTS

| | | | | |
|---|---|---|---|---|
| 8,068,084 | B2 | 11/2011 | Yeo | |
| 11,151,919 | B2 | 10/2021 | Yoon et al. | |
| 2010/0027586 | A1* | 2/2010 | Ogasawara | H03L 7/197 375/376 |
| 2013/0249609 | A1* | 9/2013 | Taki | H03L 7/183 327/156 |
| 2018/0269924 | A1* | 9/2018 | Kaji | H03L 7/18 |
| 2019/0156761 | A1* | 5/2019 | Kim | G09G 3/3677 |

FOREIGN PATENT DOCUMENTS

| | | | |
|---|---|---|---|
| KR | 20040063246 | A | 7/2004 |
| KR | 101475459 | B1 | 12/2014 |
| KR | 20190057191 | A | 5/2019 |
| KR | 102447642 | B1 | 9/2022 |

* cited by examiner

*Primary Examiner* — Brent D Castiaux
(74) *Attorney, Agent, or Firm* — CANTOR COLBURN LLP

(57) ABSTRACT

An electronic device including a spread spectrum clock generator that generates an output clock signal using an input clock signal, wherein the spread spectrum clock generator generates the output clock signal using a different spread spectrum method at a predetermined time interval.

14 Claims, 16 Drawing Sheets

DISPLAY DEVICE, DRIVING METHOD THEREOF, AND ELECTRONIC DEVICE USING THE SAME

This application claims priority to Korean Patent Application No. 10-2023-0020824, filed on Feb. 16, 2023, and all the benefits accruing therefrom under 35 U.S.C. § 119, the content of which in its entirety is herein incorporated by reference.

BACKGROUND

1. Field

The present disclosure relates to a display device, a driving method thereof, and an electronic device using the same.

2. Description of the Related Art

Due to the development of technology, the amount of data to be processed by various electronic devices has rapidly increased, and as a result, the operating speed of electronic devices have also increased.

In order to process data at high speed, electronic devices generally generate high-frequency clock signals and perform designated operations based on the generated clock signals. However, a regularly generated high-frequency clock signal can cause electromagnetic interference (hereinafter referred to as "EMI") in electronic devices that are in close proximity.

SUMMARY

The disclosure provides a display device capable of minimizing a noise of an output clock signal, a driving method thereof, and an electronic device using the same.

An electronic device according to an embodiment includes a spread spectrum clock generator that generates an output clock signal using an input clock signal, wherein the spread spectrum clock generator generates the output clock signal using a different spread spectrum method at predetermined time intervals.

According to an embodiment, the spread spectrum clock generator may generate the output clock signal using an up-spread method and/or a down-spread method.

According to an embodiment, the spread spectrum clock generator may change the spread spectrum method from an up-spread method to a down-spread method or from the down-spread method to the up-spread method at predetermined time intervals.

According to an embodiment, the spread spectrum clock generator may include a phase frequency detector that receives the input clock signal and a divided clock signal and may output a phase frequency signal representing a phase difference and/or a frequency difference between the input clock signal and the divided clock signal, a charge pump that receives the phase frequency signal and outputs a voltage and/or current corresponding to the phase frequency signal, a loop filter that filters the voltage and/or current, a profile register that stores the spread spectrum method, a spread ratio, and/or the predetermined time, a modulator that modulates a voltage supplied to the loop filter in response to the spread spectrum method, the spread ratio, and/or the predetermined time and/or a voltage controlled oscillator that may generate a frequency-modulated output clock signal using the voltage modulated by the modulator.

According to an embodiment, the spread spectrum clock generator may further include a divider that generates the divided clock signal by dividing the output clock signal.

According to an embodiment, the spread spectrum method stored in the profile register may include an up-spread method and/or a down-spread method.

According to an embodiment, the modulator may change the spread spectrum method to an up-spread method and/or a down-spread method at predetermined time intervals.

A display device according to an embodiment may include pixels disposed to be connected to scan lines and/or data lines, a data driver for supplying data signals to the data lines, a timing controller for controlling the data driver, a spread spectrum clock generator that may be included in the timing controller and for generating an output clock signal, wherein the spread spectrum clock generator may generate the output clock signal using a different spread spectrum method at predetermined time intervals.

According to an embodiment, the spread spectrum clock generator may generate the output clock signal using an up-spread method and/or a down-spread method.

According to an embodiment, the spread spectrum clock generator may change the spread spectrum method from an up-spread method to a down-spread method or from the down-spread method to the up-spread method at predetermined time intervals.

According to an embodiment, the predetermined time may be one frame period.

According to an embodiment, the predetermined time may be two or more frame periods.

According to an embodiment, the spread spectrum clock generator may include a phase frequency detector that receives an input clock signal and/or a divided clock signal and outputs a phase frequency signal representing a phase difference and/or a frequency difference between the input clock signal and the divided clock signal, a charge pump that receives the phase frequency signal and outputs a voltage and/or current corresponding to the phase frequency signal, a loop filter that filters the voltage and/or current, a profile register that stores the spread spectrum method, a spread ratio, and/or the predetermined time, a modulator that modulates a voltage supplied to the loop filter in response to the spread spectrum method, the spread ratio, and/or the predetermined time and a voltage controlled oscillator that generates a frequency-modulated output clock signal using the voltage modulated by the modulator.

According to an embodiment, the spread spectrum clock generator may further include a divider that generates the divided clock signal by dividing the output clock signal.

According to an embodiment, the spread spectrum method stored in the profile register includes an up-spread method and/or a down-spread method.

According to an embodiment, the modulator changes the spread spectrum method to an up-spread method and/or a down-spread method at predetermined time intervals.

A driving method of a display device generating a spread spectrum clock signal for data transmission according to an embodiment includes generating the spread spectrum clock signal using a first spread spectrum method, and generating the spread spectrum clock signal by using a second spread spectrum method different from the first spread spectrum method after a predetermined time.

According to an embodiment, the first spread spectrum method may be an up-spread method, and/or the second spread spectrum method may be a down-spread method.

According to an embodiment, the predetermined time may be one frame period.

According to an embodiment, the predetermined time may be at least one frame period.

The disclosure is not limited to the aforesaid, but other objects not described herein will be clearly understood by those skilled in the art from the descriptions below.

The display device according to embodiments, a driving method thereof, and an electronic device using the same can generate an output clock signal using a different spread spectrum method at predetermined time intervals, thereby reducing and/or minimizing noise.

It should be understood, however, that the effect of the present disclosure is not limited to the effect described above, and various changes and modifications may be made without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
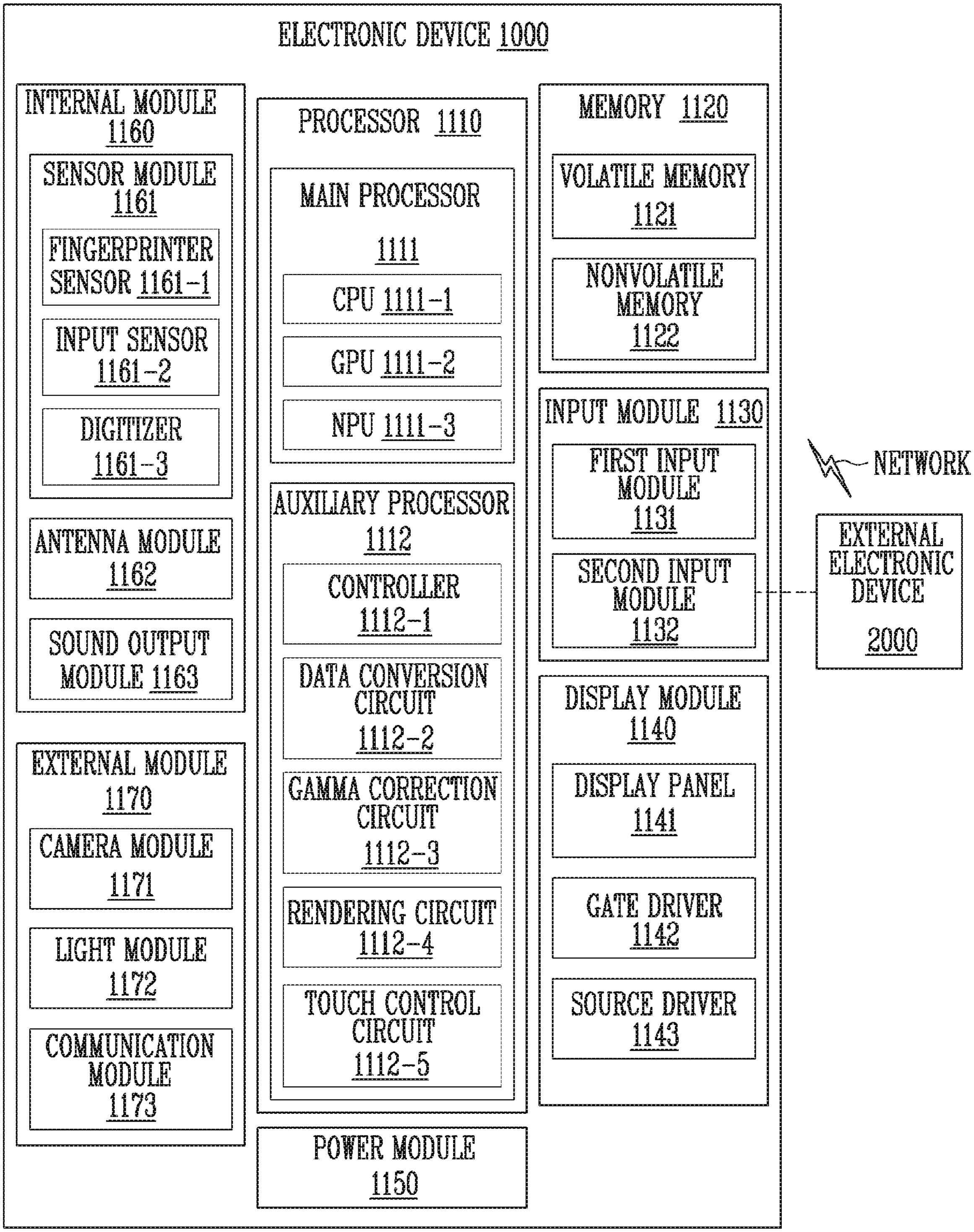
FIG. 1 is a schematic block diagram illustrating an electronic device, according to an embodiment.

Hereinafter, with reference to accompanying drawings, various embodiments will be described in detail so that those skilled in the art can easily carry out the disclosure. The disclosure may be embodied in many different forms and is not limited to the embodiments described herein.

In order to clearly illustrate the disclosure, parts that are not related to the description are omitted, and the same or similar constituent elements are given the same reference numerals throughout the specification. Therefore, the above-mentioned reference numerals can be used in other drawings.

In addition, since the size and thickness of each configuration shown in the drawings are arbitrarily shown for better understanding and ease of description, the disclosure is not necessarily limited to the illustrated one. In the drawings, the dimensions of layers and regions are exaggerated for clarity of illustration.

In addition, the expression “the same” in the description may mean “substantially the same”. That is, it may be the same degree to which a person with ordinary knowledge can understand as the same. Other expressions may also be expressions in which “substantially” is omitted.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as “about” can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an electronic device according to an embodiment.

Referring to FIG. 1, an electronic device 1000 according to an embodiment may output various information through a display module 1140. The display module 1140 may correspond to at least a part of the display device shown in FIG. 11. When the processor 1110 executes an application stored in a memory 1120, the display module 1140 may provide application information to the user through a display panel 1141. The processor 1110 may be a configuration corresponding to at least a part of the application processor 30 shown in FIG. 11. The display panel 1141 may have a configuration corresponding to at least a part of the display unit 110 shown in FIG. 11.

In an embodiment, the processor 1110 may obtain an external input through an input module 1130 and/or a sensor module 1161 and execute an application corresponding to the external input. For example, when a user selects a camera icon displayed on the display panel 1141, the processor 1110 may obtain a user input through an input sensor 1161-2 and activate the camera module 1171. The processor 1110 may transfer image data corresponding to a photographed image obtained through the camera module 1171 to the display module 1140. The display module 1140 may display an image corresponding to the photographed image through the display panel 1141.

In an embodiment, for another example, when a personal information authentication is executed in the display module 1140, a fingerprint sensor 1161-1 may obtain input fingerprint information as input data. The processor 1110 may compare the input data obtained through the fingerprint sensor 1161-1 with authentication data stored in the memory 1120 and may execute an application according to a comparison result. The display module 1140 may display information executed according to a logic of the application through the display panel 1141.

In an embodiment and for another example, when a music streaming icon displayed on the display module 1140 is selected, the processor 1110 may obtain a user input through the input sensor 1161-2 and activate a music streaming application stored in the memory 1120. When a music execution command is input into the music streaming application, the processor 1110 may activate a sound output module 1163 to provide sound information corresponding to the music execution command to the user.

In an embodiment, in the above, the operation of the electronic device 1000 has been briefly described. Hereinafter, the configuration of the electronic device 1000 will be described in detail. Some of the components of the electronic device 1000 described later may be integrated and/or provided as one component and/or may be provided by separating one component into two or more components.

In an embodiment, the electronic device 1000 may communicate with an external electronic device 2000 through a network (e.g., a short-distance wireless communication network and/or a long-distance wireless communication network). According to an embodiment, the electronic device 1000 may include the processor 1110, the memory 1120, the input module 1130, the display module 1140, the power module 1150, the internal module 1160, and/or the external module 1170. According to an embodiment, in the electronic device 1000, at least one of the above-described components may be omitted and/or one or more other components may be added. According to an embodiment, some (e.g., the sensor module 1161, the antenna module 1162, and/or the sound output module 1163) of the above-described components may be integrated into other components (e.g., the display module 1140).

In an embodiment, the processor 1110 may execute software to control at least one other component (e.g., hardware or software component) of the electronic device 1000 connected to the processor 1110 and/or may perform various data processing and/or calculations. According to an embodiment, as at least part of data processing and/or calculations, the processor 1110 may store commands and/or data received from other components (e.g., the input module 1130, the sensor module 1161, or the communication module 1173) in a volatile memory 1121, may process commands and/or data stored in the volatile memory 1121, and/or may store resultant data in the non-volatile memory 1122.

In an embodiment, the processor 1110 may include a main processor 1111 and an auxiliary processor 1112. The main processor 1111 may include at least one of a central processing unit (CPU) 1111-1 and/or an application processor (AP). The main processor 1111 may further include at least one of a graphic processing unit (GPU) 1111-2, a communication processor (CP), and an image signal processor (ISP). The main processor 1111 may further include a neural processing unit (NPU) 1111-3. The neural processing unit 1111-3 may be a processor specialized in processing an artificial intelligence model, and/or the artificial intelligence model may be generated through machine learning. The artificial intelligence model may include a plurality of artificial neural network layers. Artificial neural networks may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, and/or a combination of two or more thereof, but is not limited thereto. The artificial intelligence model may include, in addition or alternatively, software structures in addition to hardware structures. At least two of the above-described processing unit and processor may be implemented as an integrated component (e.g., a single chip) and/or each thereof may be implemented as an independent component (e.g., a plurality of chips).

In an embodiment, the auxiliary processor 1112 may include a controller 1112-1. The controller 1112-1 may include an interface conversion circuit and/or a timing control circuit. The controller 1112-1 may receive an image signal from the main processor 1111 and may convert a data format of the image signal to meet interface specifications with the display module 1140 to output image data. The controller 1112-1 may output various control signals necessary for driving the display module 1140.

In an embodiment, the auxiliary processor 1112 may further include a data conversion circuit 1112-2, a gamma correction circuit 1112-3, a rendering circuit 1112-4, a touch control circuit 1112-5, and the like. The data conversion circuit 1112-2 may receive the image data from the controller 1112-1 and may compensate for the image data so that an image is displayed with a desired luminance according to the characteristics of the electronic device 1000 and/or the user's setting, etc., and/or may convert the image data to reduce power consumption and/or compensate for afterimages. In an embodiment, the controller 1112-1 and/or the data conversion circuit 1112-2 may be components corresponding to at least a part of the timing controller 11 shown in FIG. 11.

In an embodiment, the gamma correction circuit 1112-3 may convert the image data and/or a gamma reference voltage, etc. so that the image displayed on the electronic device 1000 has desired gamma characteristics. The rendering circuit 1112-4 may receive the image data from the controller 1112-1 and render the image data in consideration of the pixel arrangement of the display panel 1141 applied to the electronic device 1000.

In an embodiment, the touch control circuit 1112-5 may supply a touch signal to the input sensor 1161-2 and/or receive a sensing signal from the input sensor 1161-2 in response to the touch signal.

In an embodiment, at least one of the data conversion circuit 1112-2, the gamma correction circuit 1112-3, the rendering circuit 1112-4, and the touch control circuit 1112-5 may be integrated into other components (e.g., the main processor 1111 and/or the controller 1112-1). At least one of the data conversion circuit 1112-2, the gamma correction circuit 1112-3, and the rendering circuit 1112-4 may be integrated into a source driver 1143 described later.

In an embodiment, the memory 1120 may store various data used by at least one component (e.g., the processor 1110 or the sensor module 1161) of the electronic device 1000 and/or input data and/or output data for commands related thereto. The memory 1120 may include at least one of the volatile memories 1121 and the non-volatile memory 1122.

In an embodiment, the input module 1130 may receive commands and/or data to be used by components (e.g., the processor 1110, the sensor module 1161, and/or the sound output module 1163) of the electronic device 1000 from the outside (the user and/or the external electronic device 2000) of the electronic device 1000.

In an embodiment, the input module 1130 may include a first input module 1131 for receiving commands and/or data from the user and a second input module 1132 for receiving commands and/or data from the external electronic device 2000. The first input module 1131 may include a microphone, a mouse, a keyboard, a key (e.g., a button), and/or a pen (e.g., a passive pen or an active pen). The second input module 1132 may support a designated protocol capable of connecting to the external electronic device 2000 wired and/or wirelessly. According to an embodiment, the second input module 1132 may include a high-definition multimedia interface (HDMI), a universal serial bus (USB) interface, an SD card interface, and/or an audio interface. The second input module 1132 may include a connector that can be physically connected to the external electronic device 2000, for example, an HDMI connector, a USB connector, an SD card connector, and/or an audio connector (e.g., a headphone connector).

In an embodiment, the display module 1140 may visually provide information to the user. The display module 1140 may include a display panel 1141, a gate driver 1142, and a source driver 1143. The gate driver 1142 may be a component corresponding to at least a part of the scan driver 13 shown in FIG. 11. The source driver 1143 may be a component corresponding to at least a part of the data driver 12 shown in FIG. 11. The display module 1140 may further include a window, a chassis, and a bracket to protect the display panel 1141.

In an embodiment, the display panel 1141 (or the display) may include a liquid crystal display panel, an organic light emitting display panel, and/or an inorganic light emitting display panel, and the type of display panel 1141 is not particularly limited. The display panel 1141 may be a rigid type or a flexible type capable of being rolled and/or folded. The display module 1140 may further include a supporter, a bracket, and/or a heat dissipation member which may support the display panel 1141.

In an embodiment, the gate driver 1142 may be mounted on the display panel 1141 as a driving chip. Also, the gate driver 1142 may be integrated into the display panel 1141. For example, the gate driver 1142 may include an amorphous silicon TFT gate driver circuit (ASG), a low temperature polycrystalline silicon (LTPS) TFT gate driver circuit, and/or an oxide semiconductor TFT gate driver circuit (OSG) internalized in the display panel 1141. The gate driver 1142 may receive a control signal from the controller 1112-1 and/or output scan signals to the display panel 1141 in response to the control signal.

In an embodiment, the display module 1140 may further include a light emitting driver. The light emitting driver may be a component corresponding to at least a part of the light emitting driver 15 shown in FIG. 11. The light emitting driver may output a light emitting control signal to the display panel 1141 in response to the control signal received from the controller 1112-1. The light emitting driver may be formed separately from the gate driver 1142 and/or integrated into the gate driver 1142.

In an embodiment, the source driver 1143 may receive a control signal from the controller 1112-1, convert image data into an analog voltage (e.g., data signal) in response to the control signal, and then output data signals to the display panel 1141.

In an embodiment, the source driver 1143 may be integrated into other components (e.g., the controller 1112-1). The functions of the interface conversion circuit and/or timing control circuit of the controller 1112-1 described above may be integrated into the source driver 1143.

In an embodiment, the display module 1140 may further include a voltage generating circuit. The voltage generating circuit may output various voltages necessary for driving the display panel 1141. In an embodiment, the display panel 1141 may include a plurality of pixel columns, each including a plurality of pixels.

In an embodiment, the source driver 1143 may convert data corresponding to red (R), green (G), and blue (B) included in the image data received from the processor 1110 into a red data signal (and/or data voltage), a green data signal, and/or a blue data signal, and/or may provide it to a plurality of pixel columns included in the display panel 1141 during one horizontal period.

In an embodiment, the power module 1150 may supply power to components of the electronic device 1000. The power module 1150 may include a battery charging a power voltage. The battery may include a non-rechargeable primary cell, a rechargeable secondary cell and/or a fuel cell. The power module 1150 may include a power management integrated circuit (PMIC). The PMIC may supply optimized power to each of the modules described above and/or modules described later. The power module 1150 may include a wireless power transmission/reception member electrically connected to the battery. The wireless power transmission/reception member may include a plurality of antenna radiators in the form of coils.

In an embodiment, the electronic device 1000 may further include an internal module 1160 and/or an external module 1170. The internal module 1160 may include a sensor module 1161, an antenna module 1162, and/or a sound output module 1163. The external module 1170 may include a camera module 1171, a light module 1172, and/or a communication module 1173.

In an embodiment, the sensor module 1161 may detect an input by a user's body and/or an input by a pen among the first input modules 1131 and/or may generate an electrical signal and/or data value corresponding to the input. The sensor module 1161 may include at least one of a fingerprint sensor 1161-1, an input sensor 1161-2, and a digitizer 1161-3.

In an embodiment, the fingerprint sensor 1161-1 may generate a data value corresponding to the user's fingerprint. The fingerprint sensor 1161-1 may include an optical and/or a capacitive fingerprint sensor.

In an embodiment, the input sensor 1161-2 may generate a data value corresponding to coordinate information of an input by a user's body and/or an input by a pen. The input sensor 1161-2 may generate a capacitance change due to the input as a data value. The input sensor 1161-2 may detect an input by a passive pen and/or transmit/receive data to/from an active pen.

In an embodiment, the input sensor 1161-2 may measure bio-signals such as blood pressure, moisture, and/or body fat. For example, when a user touches a portion of the body to a sensor layer and/or a sensing panel and does not move for a certain time, the input sensor 1161-2 may detect a bio-signal to output information desired by the user to the display module 1140 based on a change in an electric field caused by the portion of the body.

In an embodiment, the digitizer 1161-3 may generate a data value corresponding to coordinate information of an input by the pen. The digitizer 1161-3 may represent the amount of electromagnetic change by the input as a data value. The digitizer 1161-3 may detect the input by the passive pen and/or transmit/receive data to/from the active pen.

In an embodiment, at least one of the fingerprint sensor 1161-1, the input sensor 1161-2, and the digitizer 1161-3 may be implemented as a sensor layer formed on the display panel 1141 through a continuous process. At least one of the fingerprint sensor 1161-1, the input sensor 1161-2, and the digitizer 1161-3 may be disposed on the display panel 1141, and/or any one of the fingerprint sensor 1161-1, the input sensor 1161-2, and the digitizer 1161-3, for example, the digitizer 1161-3, may be disposed on the display panel 1141.

In an embodiment, at least two of the fingerprint sensor 1161-1, the input sensor 1161-2, and the digitizer 1161-3 may be integrated into one sensing panel through the same process. When integrated into one sensing panel, the sensing panel may be disposed between the display panel 1141 and a window disposed on the display panel 1141. According to an embodiment, the sensing panel may be disposed on the window, and the disposition of the sensing panel is not particularly limited.

In an embodiment, at least one of the fingerprint sensor 1161-1, the input sensor 1161-2, and the digitizer 1161-3 may be integrated into the display panel 1141. That is, at least one of the fingerprint sensor 1161-1, the input sensor 1161-2, and the digitizer 1161-1 may be formed simultaneously through a process of forming elements (e.g., light emitting elements, transistors, etc.) included in the display panel 1141.

In an embodiment, in addition, the sensor module 1161 may generate an electrical signal and/or data value corresponding to an internal state and/or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor, and/or an illuminance sensor.

In an embodiment, the antenna module 1162 may include one or more antennas for transmitting signals and/or power to the outside and/or receiving the signals and/or the power from the outside. According to an embodiment, the communication module 1173 may transmit a signal to an external electronic device and/or receive the signal from the external electronic device through an antenna suitable for a communication method. The antenna pattern of the antenna module 1162 may be integrated into one component (e.g., the display panel 1141) of the display module 1140 and/or the input sensor 1161-2.

In an embodiment, the sound output module 1163 may be a device for outputting a sound signal to the outside of the electronic device 1000, and/or may include, for example, a speaker used for general purposes such as multimedia playback and/or recording playback and/or a receiver used exclusively for receiving calls. According to an embodiment, the receiver may be formed integrally with and/or separately from the speaker. The sound output pattern of the sound output module 1163 may be integrated into the display module 1140.

In an embodiment, the camera module 1171 may photograph still images and/or moving images. According to an embodiment, the camera module 1171 may include one or more lenses, image sensors, and/or image signal processors. The camera module 1171 may further include an infrared camera capable of measuring the presence and/or absence of a user, the user's disposition, and/or the user's gaze.

In an embodiment, the light module 1172 may provide light. The light module 1172 may include a light emitting diode and/or a xenon lamp. The light module 1172 may operate in conjunction with the camera module 1171 and/or operate independently.

In an embodiment, the communication module 1173 may establish a wired and/or wireless communication channel between the electronic device 1000 and the external electronic device 2000 and/or support the communication through the established communication channel. The communication module 1173 may include one or all of a wireless communication module such as a cellular communication module, a short-distance wireless communication module, and/or a global navigation satellite system (GNSS) communication module, and/or a wired communication module such as a local area network (LAN) communication module and/or a power line communication module. The communication module 1173 may communicate with the external electronic device 2000 through a short-distance communication network such as Bluetooth, WiFi direct, and/or infrared data association (IrDA) and/or a long-distance communication network such as a cellular network, an Internet, and/or a computer network (e.g., LAN or WAN). The various types of communication modules 1173 described above may be implemented as a single chip and/or may be implemented as separate chips.

In an embodiment, the input module 1130, the sensor module 1161, the camera module 1171, and the like may be used to control the operation of the display module 1140 in conjunction with the processor 1110.

In an embodiment, the processor 1110 may output commands and/or data to the display module 1140, the sound output module 1163, the camera module 1171, and/or the light module 1172 based on the input data received from the input module 1130. For example, the processor 1110 may generate image data in response to input data input through a mouse and/or an active pen to output the image data to the display module 1140 and/or may generate command data in response to the input data to output the command data to the camera module 1171 and/or the light module 1172. When input data is not received from the input module 1130, the processor 1110 may convert the operation mode of the electronic device 1000 into a low power mode and/or a sleep mode to reduce power consumed by the electronic device 1000.

In an embodiment, the processor 1110 may output commands and/or data to the display module 1140, the sound output module 1163, the camera module 1171, and/or the light module 1172 based on the sensing data received from the sensor module 1161. For example, the processor 1110 may compare authentication data input by the fingerprint sensor 1161-1 with authentication data stored in the memory 1120 and then execute an application according to a comparison result. The processor 1110 may execute a command based on the sensing data sensed by the input sensor 1161-2 and/or the digitizer 1161-3 and/or output image data corresponding to the sensing data to the display module 1140. When the sensor module 1161 includes a temperature sensor, the processor 1110 may receive temperature data for the temperature measured from the sensor module 1161 and further perform the luminance correction on the image data based on the temperature data.

In an embodiment, the processor 1110 may receive measurement data about the presence and/or absence of a user, the disposition of the user, and/or the user's gaze from the camera module 1171. The processor 1110 may further perform the luminance correction on the image data based on the measurement data. For example, the processor 1110, which determines whether or not there is a user through an input from the camera module 1171, may output image data whose luminance is corrected through a data conversion circuit 1112-2 and/or a gamma correction circuit 1112-3 to the display module 1140.

In an embodiment, some of the above components may be connected to each other through communication methods between peripheral devices, for example, a bus, a general purpose input/output (GPIO), a serial peripheral interface (SPI), a mobile industry processor interface (MIPI), and/or a ultra path interconnect (UPI) link to exchange signals (e.g., commands or data) with each other. The processor 1110 may communicate with the display module 1140 through a predetermined interface. For example, a communication method may be any one of communication methods described above, and is not limited to the communication methods.

The electronic device 1000 according to various embodiments may be various types of devices. The electronic device 1000 may include, for example, at least one of a portable communication device (e.g., a smart phone), a computer device, a portable multimedia device, a portable medical device, a camera, a wearable device, and a home appliance. The electronic device 1000 according to an embodiment of this document is not limited to the devices described above.

Figure 2:
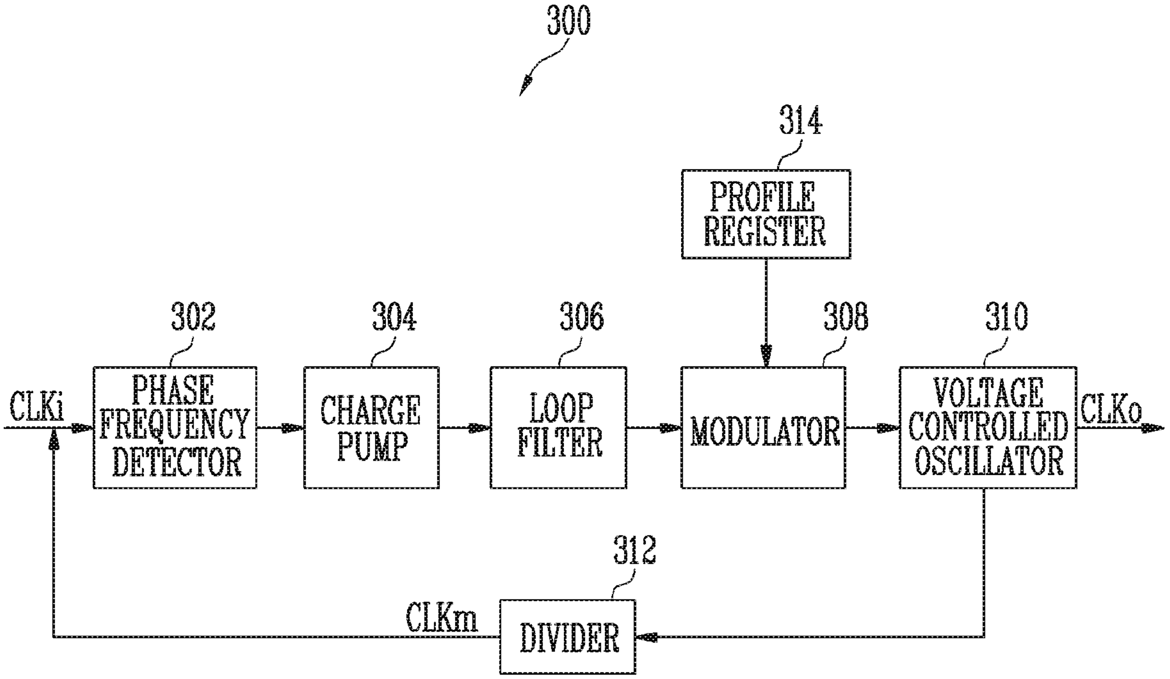
FIG. 2 is a block diagram illustrating a spread spectrum clock generator, according to an embodiment.

FIG. 2 is a block diagram illustrating a spread spectrum clock generator according to an embodiment.

Referring to FIG. 2, a spread spectrum clock generator 300 according to an embodiment may include a phase frequency detector 302, a charge pump 304, and/or a loop filter 306, a modulator 308, a voltage controlled oscillator 310, a divider 312, and/or a profile register 314. The spread spectrum clock generator 300 may receive an input clock signal CLKi and frequency modulate the received input clock signal CLKi to generate an output clock signal CLKo (and/or a spread spectrum clock signal).

In an embodiment, spread spectrum clock generator 300 may be included in the electronic device 1000 of FIG. 1. For example, the spread spectrum clock generator 300 may generate a clock signal for data communication of the electronic device 1000. Interfaces for data communication of the electronic device 1000 may include, for example, a universal serial bus (USB), a peripheral component interconnect express (PCIe), a secure digital input/output (SDIO), a secure digital card (SDC), and/or a mobile industry processor interface (MIPI), but is not limited thereto.

In an embodiment, the phase frequency detector 302 may receive the input clock signal CLKi and/or the divided clock signal CLKm output from the divider 312, and may output a phase frequency signal representing a phase difference and/or frequency difference between the input clock signal CLKi and the divided clock signal CLKm.

In an embodiment, the charge pump 304 may receive the phase frequency signal, and may supply a voltage (and/or current) signal corresponding to the received phase frequency signal to the loop filter 306.

In an embodiment, the loop filter 306 may filter (e.g., low pass filtering) a voltage (and/or current) signal provided from the charge pump 304. For example, the loop filter 306 may filter noise included in a voltage (and/or current) signal.

In an embodiment, a bit value for a spread spectrum method and/or a bit value for a spread ratio may be stored in the profile register 314. In addition, a bit value corresponding to a predetermined time may be stored in the profile register 314 so that the spread spectrum method may be changed at predetermined time intervals (and/or at predetermined period intervals). The spread ratio may correspond to the spread bandwidth of the output clock signal CLKo output from the voltage controlled oscillator 310.

In an embodiment, a bit (e.g., "1") corresponding to the down-spread method and/or a bit (e.g., "0") corresponding to the up-spread method may be stored in the profile register 314. A bit corresponding to a spread ratio, for example, a bit (e.g., "01") corresponding to a spread ratio of 1% may be stored in the profile register 314. Here, the bit corresponding to the spread ratio may be set in various ways corresponding to the spread ratio. For example, when the spread ratio is 0.5%, the corresponding bit may be set to "00", and when the spread ratio is 1.5%, the corresponding bit may be set to "10".

In an embodiment, in the profile register 314, at least two spread spectrum methods and/or spread ratios corresponding thereto may be stored. Here, bits corresponding to the spread spectrum methods and/or bits corresponding to the spread ratios may be set in various ways.

In an embodiment, bits corresponding to a predetermined time may be stored in the profile register 314. The predetermined time means a time during which the spread spectrum method is changed, and/or the modulator 308 may change the spread spectrum method in response to the predetermined time. For example, the modulator 308 may change the spread spectrum method from a down-spread method to an up-spread method and/or from an up-spread method to a down-spread method based on the predetermined time.

Additionally, in an embodiment, in the above description, it has been described that the spread spectrum method may be changed to an up-spread method (or a first spread spectrum method) and/or a down-spread method (or a second spread spectrum method), but the present disclosure is not limited thereto. For example, the spread spectrum method may further include a center-spread method. In an embodiment, the spread spectrum method may be changed to an up-spread method (and/or a down-spread method) and/or a center-spread method at predetermined time intervals. In an embodiment, the spread spectrum method may be changed to an up-spread method, a center-spread method, and/or a down-spread method at predetermined time intervals.

In an embodiment, the modulator 308 may receive the spread spectrum method, the spread ratio, and/or the predetermined time from the profile register 314. The modulator 308 may modulate the voltage supplied from the loop filter 306 in response to the spread spectrum method and/or the spread ratio, and/or may supply the modulated voltage to the voltage controlled oscillator 310. Here, the modulator 308 may generate a modulation voltage by changing the spread spectrum method at predetermined time intervals.

In an embodiment, the voltage controlled oscillator 310 may generate a frequency modulated output clock signal CLKo by performing oscillation in response to the modulated voltage.

In an embodiment, the divider 312 may divide the output clock signal CLKo to generate a divided clock signal CLKm and provide the divided clock signal CLKm to the phase frequency detector 302.

Figure 3:
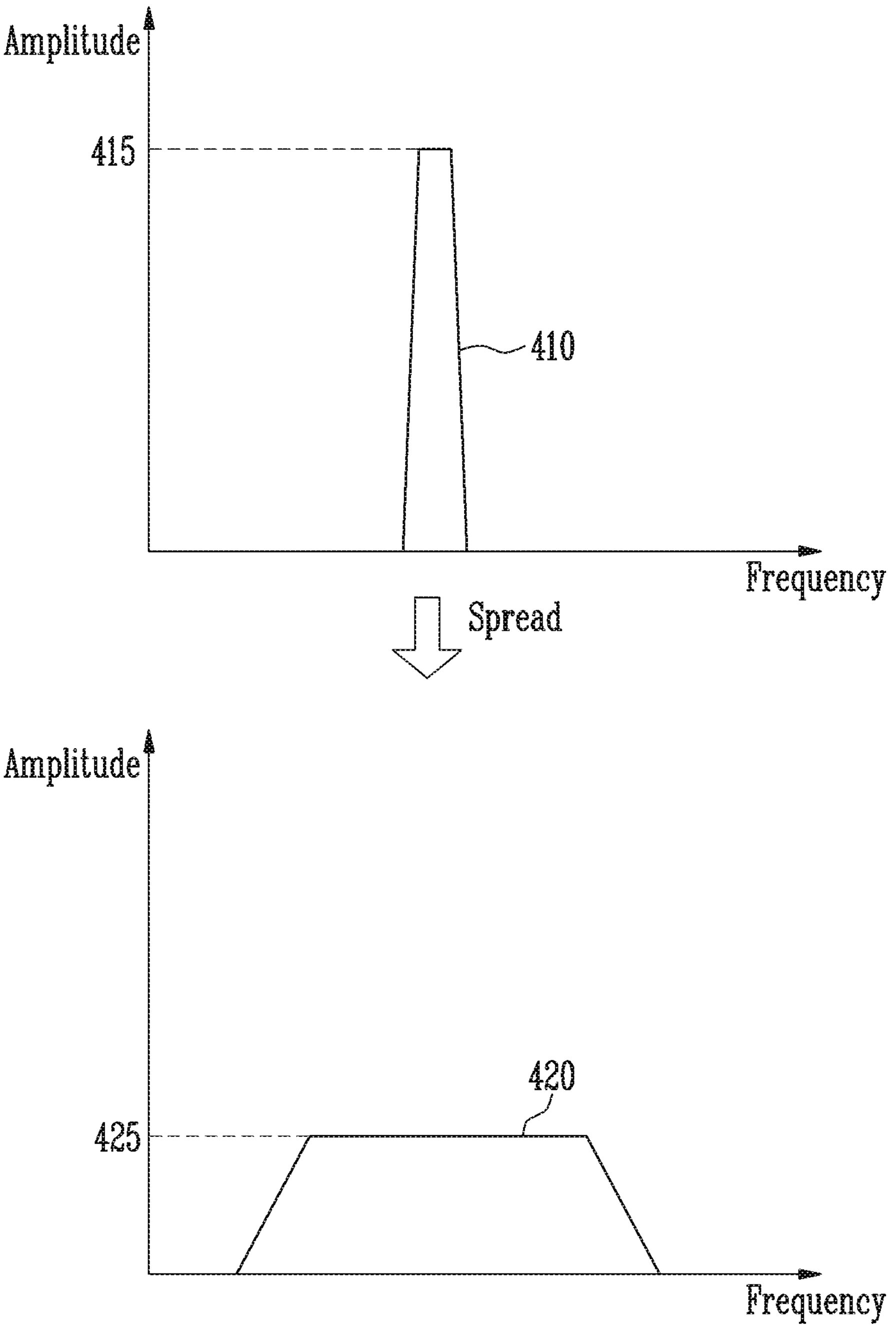
FIG. 3 is a graph illustrating a frequency band distribution corresponding to a spread spectrum method, according to an embodiment.

FIG. 3 is a graph illustrating a frequency band distribution corresponding to a spread spectrum method, in an embodiment.

In an embodiment, FIG. 3 shows a first frequency domain signal 410 when the spread spectrum method is not applied and a second frequency domain signal 420 when the spread spectrum method is applied. For example, the area of the first frequency domain signal 410 and the second frequency domain signal 420 may be the same, and accordingly, the energy thereof may be the same.

In an embodiment, the second frequency domain signal 420 may have a wider frequency bandwidth compared to the first frequency domain signal 410. In this case, the peak value 425 of the second frequency domain signal 420 may be set lower than the peak value 415 of the first frequency domain signal 410. Accordingly, EMI can be reduced when a clock signal (e.g., an output clock signal CLKo) for the data communication is generated using the spread spectrum clock generator 300.

Figure 4A:
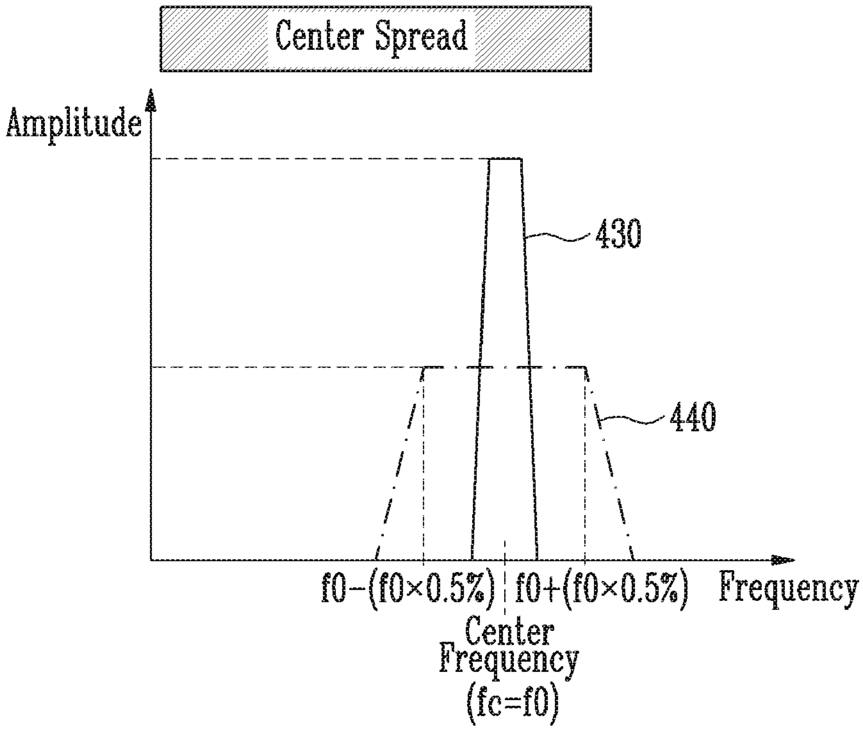
FIG. 4A is a graph illustrating a center-spread method among spread spectrum methods, according to an embodiment.
Figure 4B:
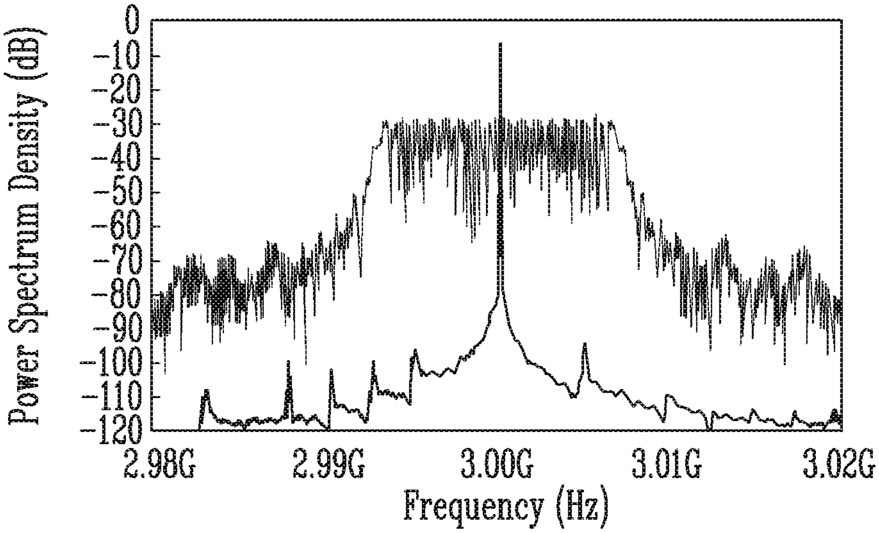
FIG. 4B is a graph illustrating a center-spread method among spread spectrum methods, according to an embodiment.
Figure 4C:
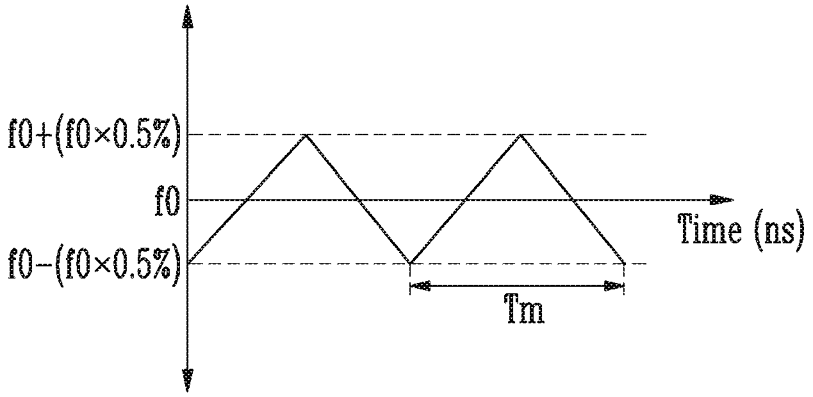
FIG. 4C is a graph illustrating a center-spread method among spread spectrum methods, according to an embodiment.

FIGS. 4A to 4C are drawings illustrating an embodiment of a center-spread method among spread spectrum methods.

In an embodiment, FIG. 4A shows a first frequency domain signal 430 when the spread spectrum method is not applied and a second frequency domain signal 440 when the center-spread method is applied. And FIG. 4B is a graph showing simulation results of the center-spread method. When the spread ratio is 1% and the center frequency is f0, the second frequency domain signal 440 in the center-spread method may have a frequency band of f0−(f0×0.5%) to f0+(f0×0.5%).

In an embodiment, FIG. 4C is a graph showing a triangular wave modulation profile. The modulation profile is a curve obtained by observing the frequency variation curve of the output clock signal CLKo in terms of time. The frequency of the output clock signal CLKo may be changed according to a modulation period Tm between f0−(f0×0.5%) and f0+(f0×0.5%). In FIG. 4C, the modulation frequency corresponds to 1/Tm. In FIG. 4C, an example of performing the spread spectrum modulation in the form of a triangular wave is shown, but the spread spectrum modulation may be performed in the form of a sine wave and/or an irregular form.

Figure 5A:
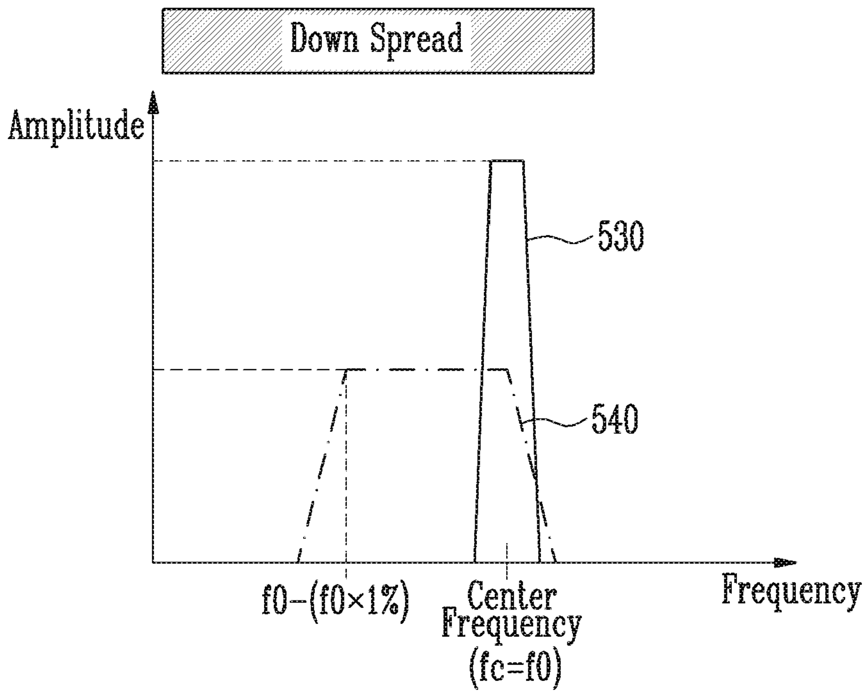
FIG. 5A is a graph illustrating a down-spread method among spread spectrum methods, according to an embodiment.
Figure 5B:
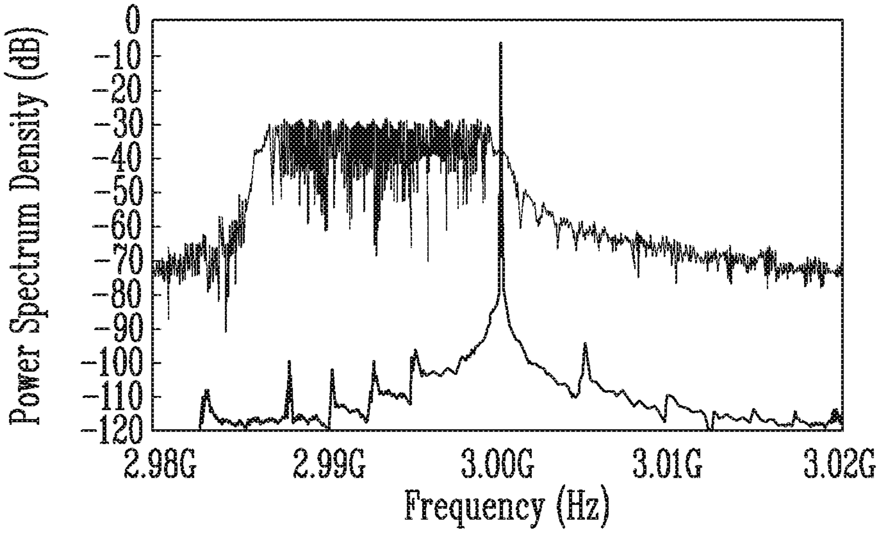
FIG. 5B is a graph illustrating a down-spread method among spread spectrum methods, according to an embodiment.
Figure 5C:
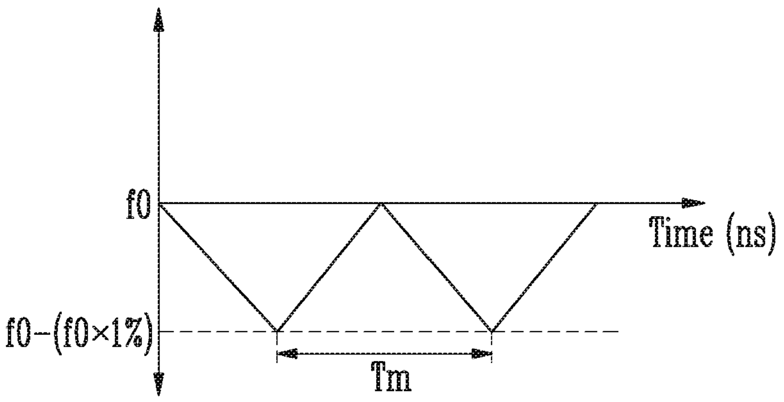
FIG. 5C is a graph illustrating a down-spread method among spread spectrum methods, according to an embodiment.

FIGS. 5A to 5C are graphs illustrating a down-spread method among spread spectrum methods, in accordance with an embodiment.

In an embodiment, FIG. 5A shows a first frequency domain signal 530 when the spread spectrum method is not applied and a second frequency domain signal 540 when the down spread method is applied. And, FIG. 5B is a graph showing the simulation result of the down-spread method. When the spread ratio is 1% and the center frequency is f0, the second frequency domain signal 540 in the down-spread method may have a frequency band from f0−(f0×1%) to f0.

In an embodiment, FIG. 5C is a graph showing a triangular wave modulation profile. The frequency of the output clock signal CLKo may be varied according to the modulation period Tm between f0−(f0×1%) and f0. In FIG. 5C, the modulation frequency corresponds to 1/Tm. In FIG. 5C, an example of performing the spread spectrum modulation in the form of a triangular wave is shown, but the spread spectrum modulation may be performed in the form of a sine wave and/or an irregular form.

Figure 6A:
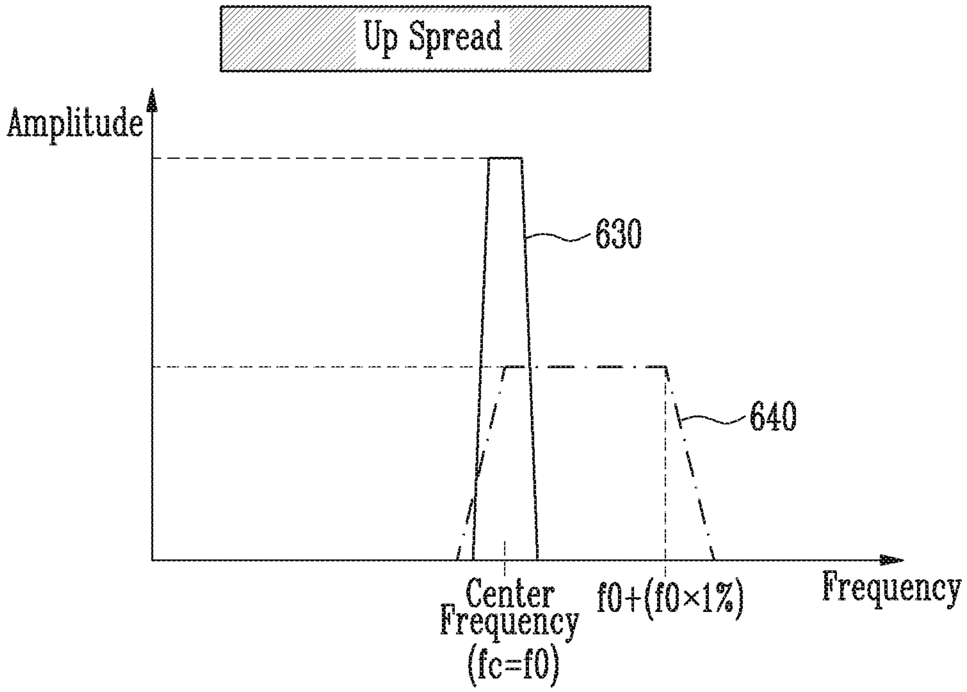
FIG. 6A is a graph illustrating an up-spread method among spread spectrum methods, according to an embodiment.
Figure 6B:
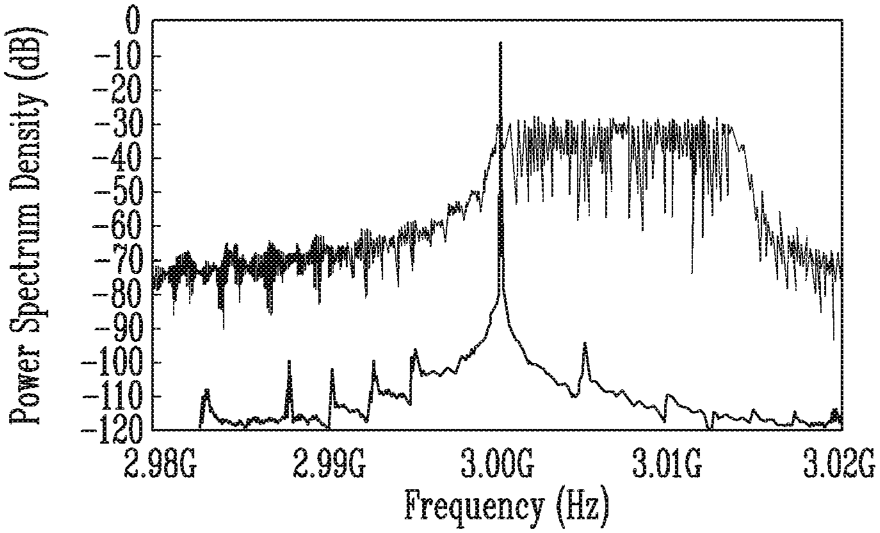
FIG. 6B is a graph illustrating an up-spread method among spread spectrum methods, according to an embodiment.
Figure 6C:
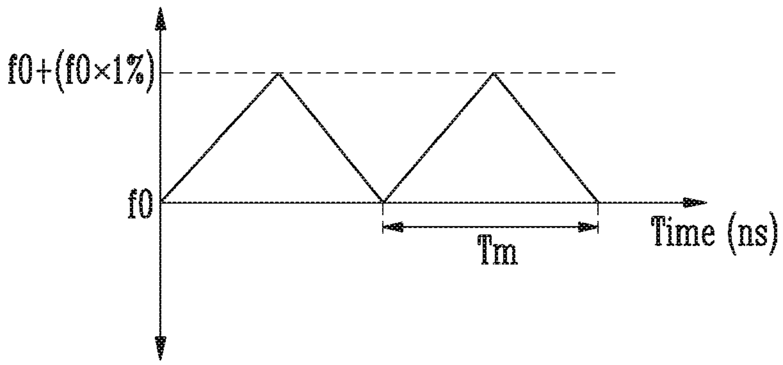
FIG. 6C is a graph illustrating an up-spread method among spread spectrum methods, according to an embodiment.

FIGS. 6A to 6C are graphs illustrating an up-spread method among spread spectrum methods according to an embodiment.

In an embodiment, FIG. 6A shows a first frequency domain signal 630 when the spread spectrum method is not applied and a second frequency domain signal 640 when the up-spread spectrum method is applied. And, FIG. 6B is a graph showing the simulation result of the up-spread method. When the spread ratio is 1% and the center frequency is f0, the second frequency domain signal 640 in the up-spread method may have a frequency band from f0 to f0+(f0×1%).

In an embodiment, FIG. 6C is a graph showing a triangular wave modulation profile. The frequency of the output clock signal CLKo may be varied according to the modulation period Tm between f0 and f0+(f0×1%). In FIG. 6C, the modulation frequency corresponds to 1/Tm. In FIG. 6C, an example of performing the spread spectrum modulation in the form of a triangular wave is shown, but the spread spectrum modulation may be performed in the form of a sine wave and/or an irregular form.

In an embodiment, FIGS. 7A to 7E are graphs illustrating RF noise measurement results according to a comparative example. The graphs shown in FIGS. 7A to 7E may show a frequency domain where the x-axis is the frequency (Hz) and the y-axis is the power (dBm). In FIGS. 7A to 7E, it is assumed that the spread spectrum clock generator 300 generates the output clock signal CLKo using the same spread spectrum method, for example, the center-spread method.

Figure 7A:
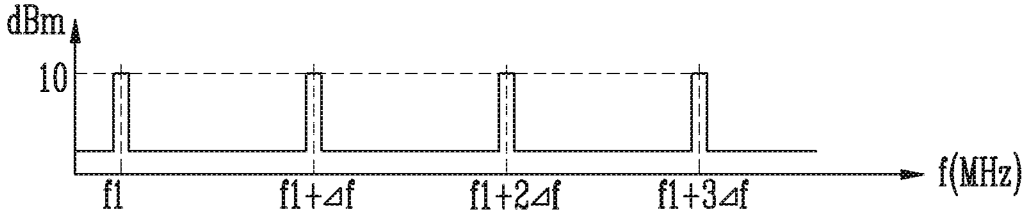
FIG. 7A is a graph illustrating RF noise measurement results according to a comparative example, according to an embodiment.
Figure 7B:
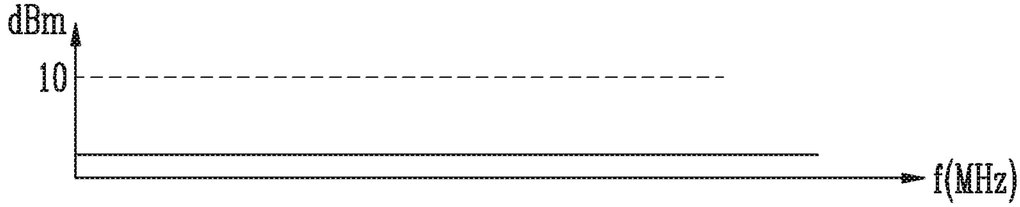
FIG. 7B is a graph illustrating RF noise measurement results according to a comparative example, according to an embodiment.
Figure 7C:
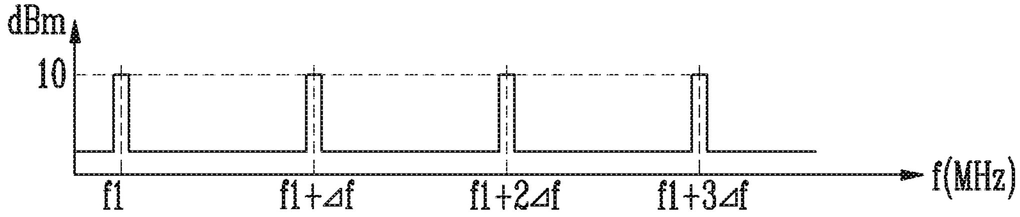
FIG. 7C is a graph illustrating RF noise measurement results according to a comparative example, according to an embodiment.
Figure 7D:
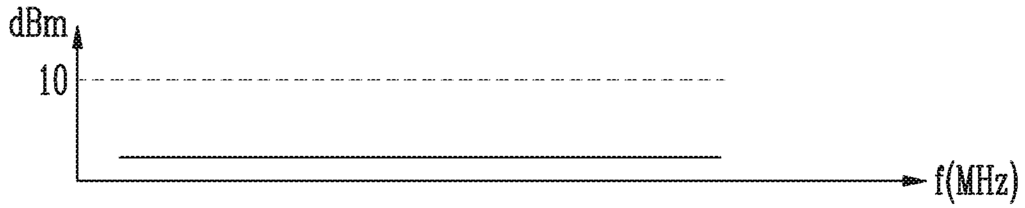
FIG. 7D is a graph illustrating RF noise measurement results according to a comparative example, according to an embodiment.

In an embodiment, FIG. 7A may be a graph showing frequency components corresponding to the RF noise as a result of the first RF noise measurement, FIG. 7B may be a graph showing frequency components corresponding to the RF noise as a result of the second RF noise measurement, FIG. 7C may be a graph showing frequency components corresponding to the RF noise as a result of the third RF noise measurement, and FIG. 7D may be a graph showing frequency components corresponding to the RF noise as a result of the fourth RF noise measurement. Since the RF noise is not always generated at each measurement, it may be assumed that the RF noise is not measured in the second and/or fourth RF noise measurement (and/or even-numbered RF noise measurements).

Figure 7E:
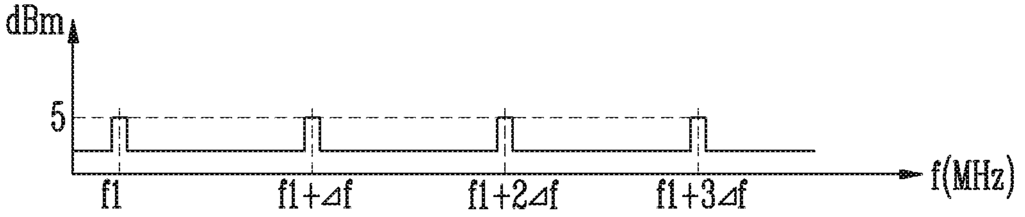
FIG. 7E is a graph illustrating RF noise measurement results according to a comparative example, according to an embodiment.

In an embodiment, when the RF noise measurement is performed about 100 times as shown in FIG. 7A to FIG. 7D and an average value thereof is calculated, the average RF noise level may be about 5 dBm as shown in FIG. 7E. That is, since the output clock signal CLKo is generated by the same spread spectrum method, the noise component shown on the graph may be generated at the same position (e.g., f1, f1+Δf, f1+2Δf, f1+3Δf) on the x-axis. In this case, since a frequency component corresponding to the RF noise is not dispersed, there may be a limit to lowering the average RF noise level.

Figure 8:
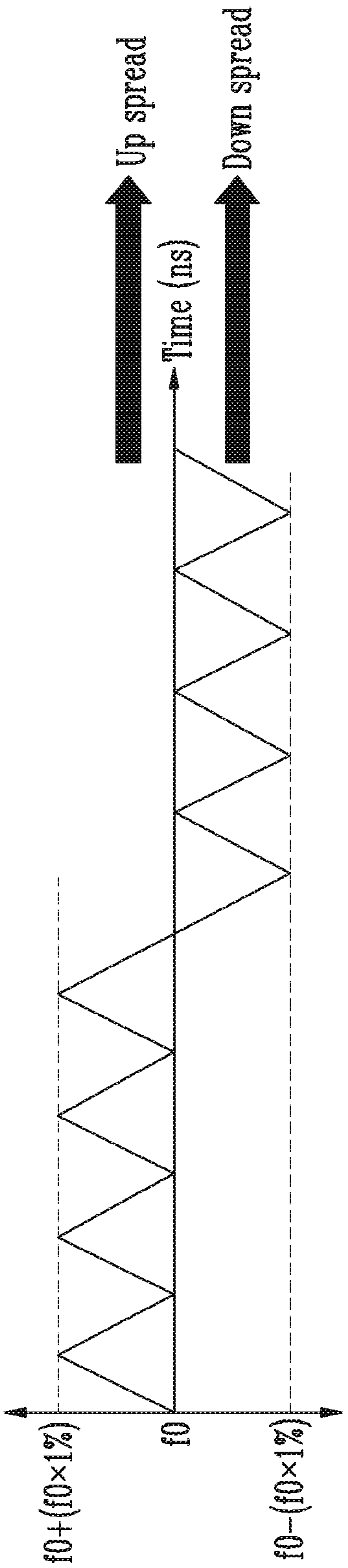
FIG. 8 is a graph illustrating a spread spectrum method, according to an embodiment.

FIG. 8 is a graph illustrating a spread spectrum method according to an embodiment. FIG. 8 is a graph assuming that the spread ratio is about 2%.

Referring to FIGS. 2 and 8, in an embodiment, the spread spectrum clock generator 300 may change the spread spectrum method at predetermined time intervals. For example, the spread spectrum clock generator 300 may change the spread spectrum method to the up-spread method and/or the down-spread method based on a predetermined time. For example, the spread spectrum clock generator 300 may change the spread spectrum method from the down-spread method to the up-spread method and/or from the up-spread method to the down-spread method based on the predetermined time (and/or every predetermined period).

In an embodiment, when the spread spectrum clock generator 300 is driven in the up-spread method, the output clock signal CLKo may have a frequency band from f0 to f0+(f0×1%). When the spread spectrum clock generator 300 is driven in the down-spread method, the output clock signal CLKo may have a frequency band between f0−(f0×1%) and f0.

That is, in an embodiment, the output clock signal CLKo generated by the spread spectrum clock generator 300 may have different frequency values based on the predetermined time. When the output clock signal CLKo has different frequency values based on the predetermined time, frequency components corresponding to the RF noise may be dispersed.

FIGS. 9A to 9F are graphs illustrating RF noise measurement results according to an embodiment. The graphs shown in FIGS. 9A to 9F may show a frequency domain where the x-axis is the frequency (Hz) and the y-axis is the power (dBm).

Figure 9A:
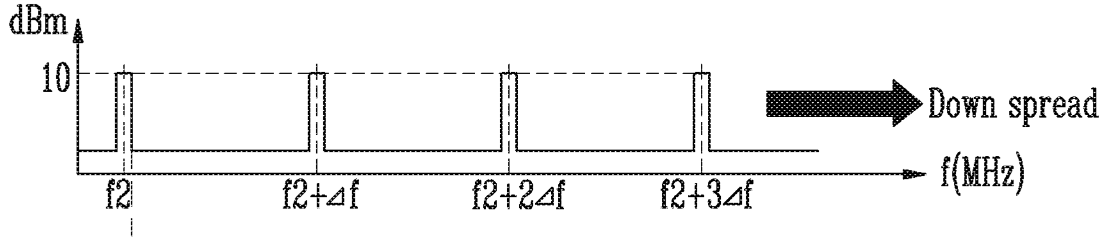
FIG. 9A is a graph illustrating RF noise measurement results, according to an embodiment.

In an embodiment, FIG. 9A may be a graph showing frequency components corresponding to the RF noise as a result of the first RF noise measurement. Here, during the first RF noise measurement, the spread spectrum clock generator 300 may generate the output clock signal CLKo by the down-spread method.

Figure 9B:
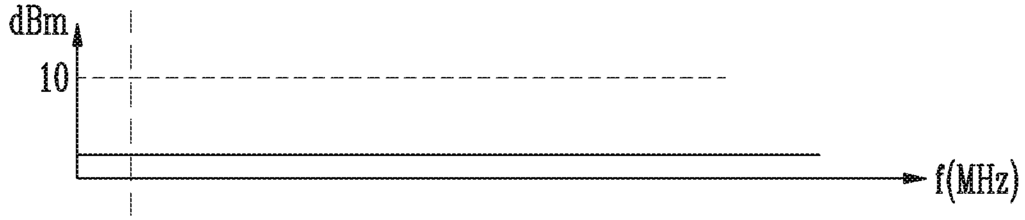
FIG. 9B is a graph illustrating RF noise measurement results, according to an embodiment.
Figure 9C:
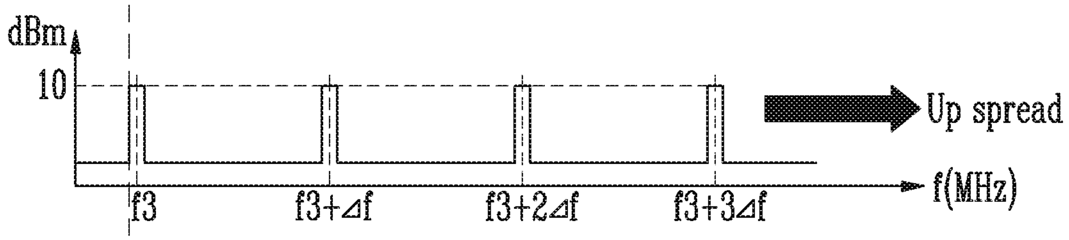
FIG. 9C is a graph illustrating RF noise measurement results, according to an embodiment.

In an embodiment, FIG. 9C may be a graph showing frequency components corresponding to the RF noise as a result of the third RF noise measurement. Here, during the third RF noise measurement, the spread spectrum clock generator 300 may generate the output clock signal CLKo by the up-spread method.

Figure 9D:
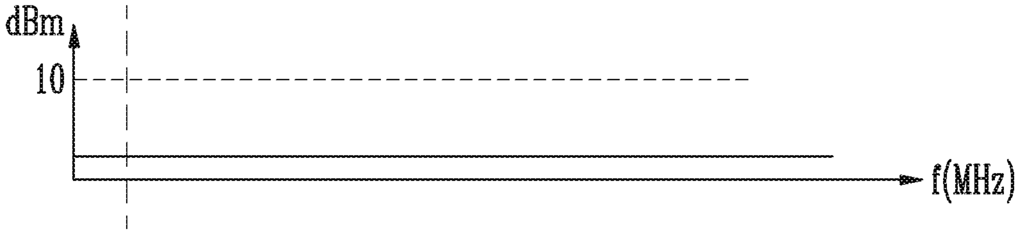
FIG. 9D is a graph illustrating RF noise measurement results, according to an embodiment.
Figure 9E:
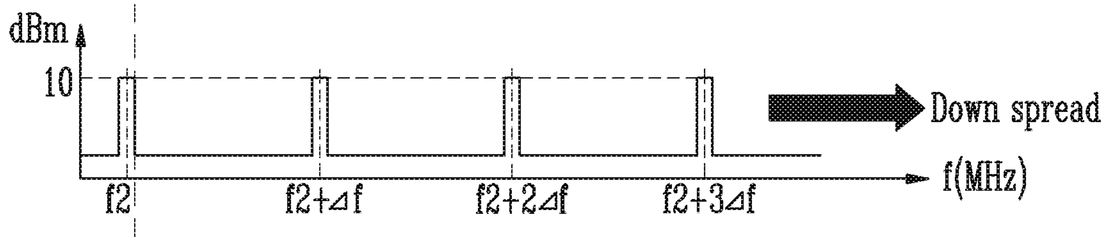
FIG. 9E is a graph illustrating RF noise measurement results, according to an embodiment.

In an embodiment, FIG. 9E may be a graph showing frequency components corresponding to the RF noise as a result of the fifth RF noise measurement. Here, during the fifth RF noise measurement, the spread spectrum clock generator 300 may generate the output clock signal CLKo by the down-spread method.

In an embodiment, FIG. 9B and FIG. 9D may be graphs showing a result of the second RF noise measurement and a result of the fourth RF noise measurement, respectively. Since the RF noise is not always generated at each measurement, it may be assumed that the RF noise is not measured in the second and fourth RF noise measurement (or even-numbered RF noise measurements).

Figure 9F:
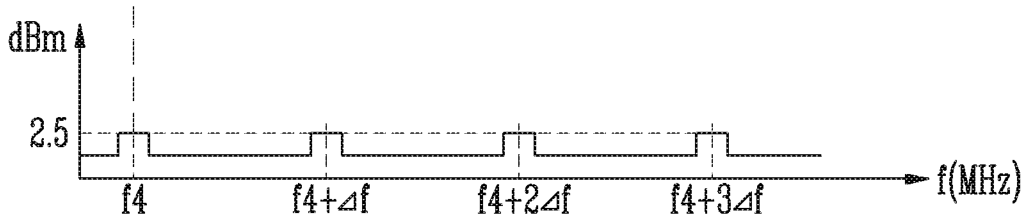
FIG. 9F is a graph illustrating RF noise measurement results, according to an embodiment.

In an embodiment, when the RF noise measurements are performed about 100 times as shown in FIG. 9A to FIG. 9D and an average value thereof is calculated, the average RF noise level may be about 2.5 dBm as shown in FIG. 9F. That is, when the output clock signal CLKo is generated in the down-spread method, noise components shown on the graph may be disposed at f2, f2+Δf, f2+2Δf, and f2+3Δf on the x-axis. Also, when the output clock signal CLKo is generated by the up-spread method, noise components shown on the graph may be disposed at f3, f3+Δf, f3+2Δf, and f3+3Δf on the x-axis. Therefore, the average noise component may be disposed at f4, f4+Δf, f4+2Δf, and f4+3Δf of the x-axis. Here, f2 and f3 may be disposed at different positions on the x-axis (e.g., f4 corresponds to a midpoint value between f2 and f3), and thus the average RF noise level may be lowered.

Figure 10:
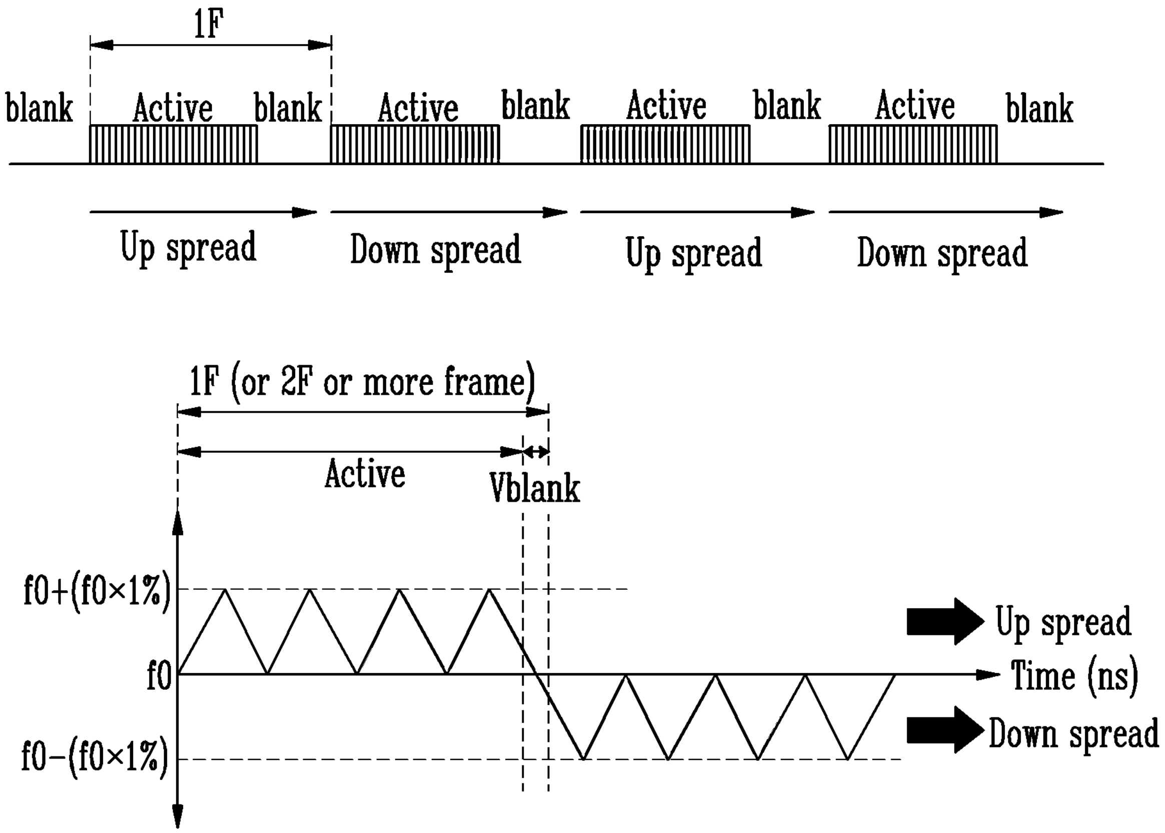
FIG. 10 is a graph illustrating a predetermined time in which a spread spectrum method is changed, according to an embodiment.

FIG. 10 is a graph illustrating a predetermined time in which a spread spectrum method is changed. In an embodiment, FIG. 10 may show a case in which the spread spectrum clock generator is applied to a display device.

In an embodiment and referring to FIG. 10, the display device may be driven in units of frames. One frame 1F of the display device may include an active period and a blank period.

In an embodiment, the active period may refer to a period in which data signals are written into pixels included in the display device. The blank period may refer to a period in which a data signal is not supplied and pixels emit light in response to the data signal written in the active period.

In an embodiment, when the spread spectrum clock generator 300 is applied to the display device, the predetermined time may be about at least one frame (1F) period. For example, the spread spectrum clock generator 300 may change the spread spectrum method based on one frame period.

In an embodiment, the spread spectrum clock generator 300 may change the spread spectrum method to the up-spread method or the down-spread method based on one frame period. For example, the spread spectrum clock generator 300 may change the spread spectrum method from a down-spread method to an up-spread method or from an up-spread method to a down-spread method based on one frame period.

Additionally, in an embodiment, with reference to FIG. 10, it has been described that the spread spectrum method is changed based on one frame period, but the embodiments are not limited thereto. For example, the spread spectrum clock generator 300 may change the spread spectrum method based on a period of at least one frame, for example, a period of two frames (2F).

Figure 11:
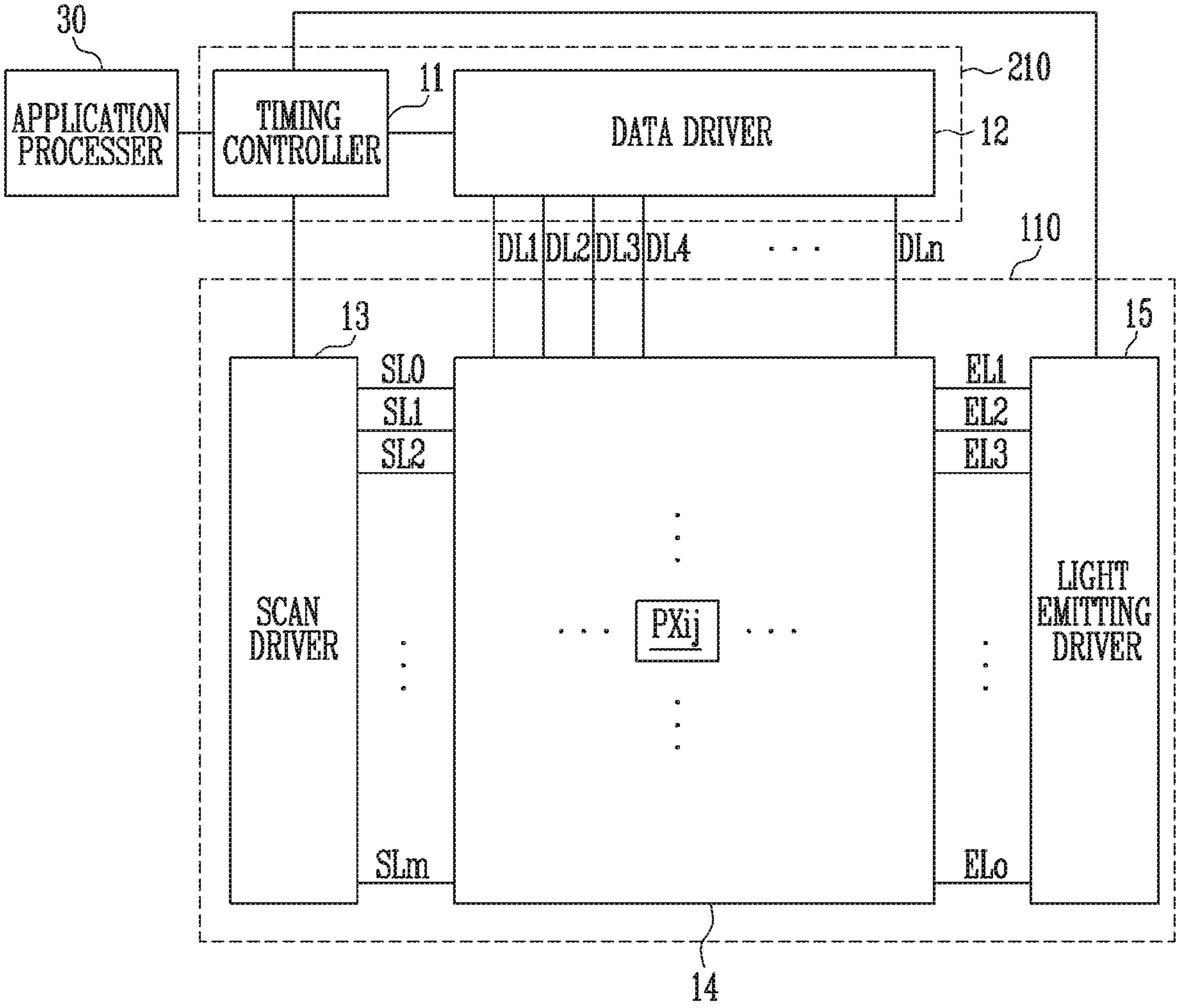
FIG. 11 is a schematic block diagram illustrating a display device according to an embodiment.

FIG. 11 is a drawing illustrating a display device according to an embodiment.

Referring to FIG. 11, the display device according to an embodiment may include a display driver 210 and a display unit 110. The display driver 210 may include a timing controller 11 and a data driver 12, and the display unit 110 may include a scan driver 13 and a light emitting driver 15. Here, whether each functional unit is integrated into one IC, integrated into a plurality of ICs, and/or mounted on a display substrate may be variously configured according to a specification of a display device.

In an embodiment, the timing controller 11 may receive data and/or timing signals corresponding to the frame period from the application processor 30. The data may be supplied in units of horizontal lines in each horizontal period. The horizontal line may refer to a pixel row in which pixels connected to the same scan line are disposed.

In an embodiment, the timing controller 11 may render data to correspond to the specifications of the display device (or the pixel unit 14). For example, the application processor 30 may provide red data, green data, and/or blue data for each unit dot.

In an embodiment, for example, when the pixel unit 14 has an RGB stripe structure, each of pixels may correspond to each of the data. In this case, the rendering of data may be unnecessary. However, for example, when the pixel unit 14 has a PENTILE® structure, since adjacent unit dots share pixels, each pixel may not correspond to each data one-to-one. In this case, the rendering of data may be required. Rendered and/or unrendered data may be provided to the data driver 12. Also, the timing controller 11 may provide a data control signal to the data driver 12. Also, the timing controller 11 may provide a scan control signal to the scan driver 13.

Additionally, in an embodiment, the timing controller 11 may include the spread spectrum clock generator 300 shown in FIG. 2. The output clock signal CLKo generated by the spread spectrum clock generator 300 may be used inside the timing controller 11. Also, the output clock signal CLKo generated by the spread spectrum clock generator 300 may be supplied to the data driver 12. For example, the output clock signal CLKo may be embedded in data and supplied to the data driver 12.

In an embodiment, the spread spectrum clock generator 300 may be additionally provided in a part where the data transmission may be required in the display device. For example, the spread spectrum clock generator 300 may be included in the application processor 30 for the data transmission between the application processor 30 and the timing controller 11.

In an embodiment, the data driver 12 may generate data signals to be provided to the data lines DL1 to DLn (e.g., where n is a natural number) using the data and/or the data control signal received from the timing controller 11.

In an embodiment, the scan driver 13 may generate scan signals to be provided to the scan lines SL0 to SLm (e.g., where m is a natural number) using the clock signal and/or the scan start signal received from the timing controller 11. The scan driver 13 may sequentially supply scan signals having turn-on level pulses to the scan lines SL0 to SLm. For example, the scan driver 13 may sequentially supply scan signals of the turn-on level to the scan lines SL0 to SLm in a period corresponding to that of the horizontal synchronization signal Hsync during an active period in which data is supplied. The scan driver 13 may include scan stages configured in the form of shift registers. The scan driver 13 may generate scan signals by sequentially transferring scan start signals that are in the form of turn-on level pulses to the next scan stage according to the control of the clock signal.

In an embodiment, the light emitting driver 15 may generate light emitting control signals to be provided to the light emitting control lines EL1 to ELo (e.g., where o is a natural number) using the clock signal, the light emitting start signal, and/or the like received from the timing controller 11. The light emitting driver 15 may sequentially supply light emitting control signals having turn-off level pulses to the light emitting control lines EL1 to ELo. The light emitting driver 15 may include light emitting stages configured in the form of a shift register. The light emitting driver 15 may generate light emitting control signals by sequentially transferring a light emitting start signal that is the form of turn-off level pulses to the next light emitting stage according to the control of the clock signal.

In an embodiment, the pixel unit 14 may include pixels PX. Each of the pixels PX may be connected to a data line and/or a scan line corresponding thereto. For example, the pixel PXij may be connected to the i-th scan line and/or the j-th data line. The pixels may include pixels emitting light of a first color, pixels emitting light of a second color, and/or pixels emitting light of a third color. The first color, the second color, and/or the third color may be different colors from each other. For example, the first color may be one color among red, green, and blue, the second color may be one color other than the first color among red, green, and blue, and the third color may be other color other than the first color and the second color among red, green, and blue. Also, magenta, cyan, and yellow may be used instead of red, green, and blue as the first to third colors.

Figure 12:
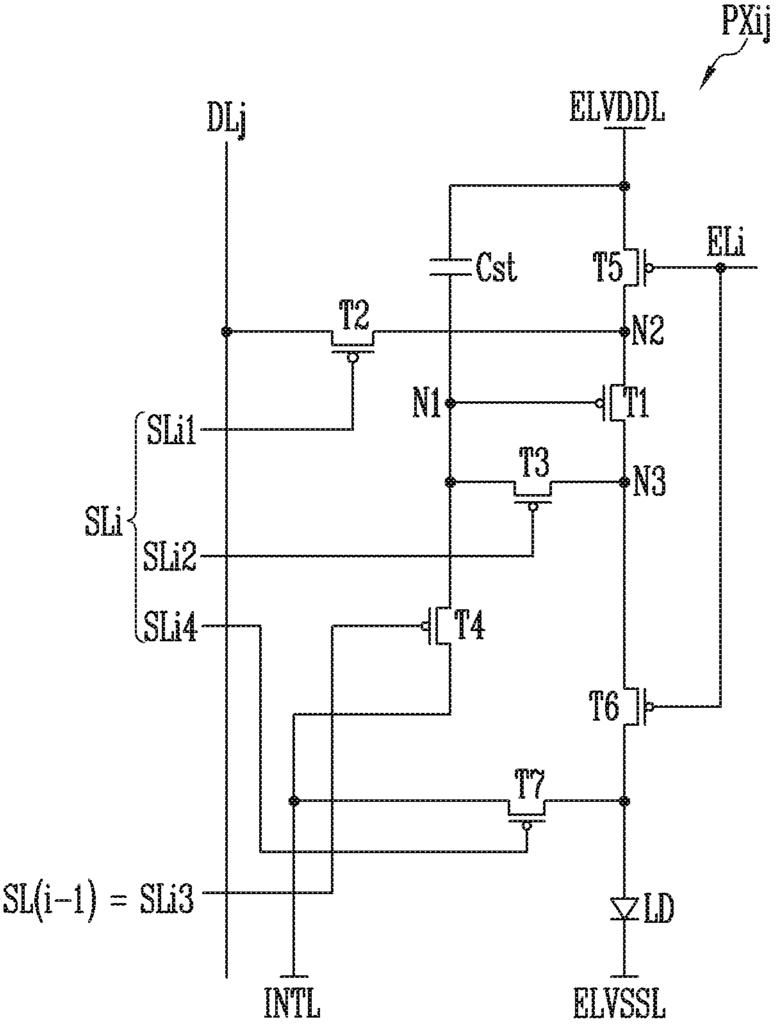
FIG. 12 is a schematic diagram illustrating a pixel circuit, according to an embodiment.

FIG. 12 is a schematic diagram illustrating a pixel according to an embodiment.

Referring to FIG. 12, a pixel PXij according to an embodiment may include transistors T1, T2, T3, T4, T5, T6, and/or T7, a storage capacitor Cst, and/or a light emitting element LD.

Hereinafter, an embodiment of a circuit composed of a P-type transistor will be described as an example. However, according to various embodiments, those skilled in the art will be able to design a circuit composed of an N-type transistor by changing a polarity of a voltage applied to a gate terminal. Similarly, those skilled in the art will be able to design a circuit composed of a combination of a P-type transistor and/or an N-type transistor. The transistor may be configured in various forms, such as a thin film transistor (TFT), a field effect transistor (FET), a bipolar junction transistor (BJT), and/or the like.

In an embodiment, the first transistor T1 may have a gate electrode connected to a first node N1, a first electrode connected to a second node N2, and a second electrode connected to a third node N3. The first transistor T1 may be referred to as a driving transistor.

In an embodiment, the second transistor T2 may have a gate electrode connected to the scan line SLi1, a first electrode connected to the data line DLj, and a second electrode connected to the second node N2. The second transistor T2 may be referred to as a scan transistor.

In an embodiment, the third transistor T3 may have a gate electrode connected to the scan line SLi2, a first electrode connected to the third node N3, and a second electrode connected to the first node N1. The third transistor T3 may be referred to as a diode-connected transistor.

In an embodiment, the fourth transistor T4 may have a gate electrode connected to the scan line SLi3, a first electrode connected to the first node N1, and a second electrode connected to the initialization line INTL. The fourth transistor T4 may be referred to as a gate initialization transistor.

In an embodiment, the fifth transistor T5 may have a gate electrode connected to the i-th light emitting control line ELi, a first electrode connected to the first power line ELVDDL, and a second electrode connected to the second node N2. The fifth transistor T5 may be referred to as a light emitting transistor.

In an embodiment, the sixth transistor T6 may have a gate electrode connected to the i-th light emitting control line ELi, a first electrode connected to the third node N3, and a second electrode connected to the anode of the light emitting element LD. The sixth transistor T6 may be referred to as a light emitting transistor. In another embodiment, the gate electrode of the sixth transistor T6 may be connected to a light emitting control line different from the light emitting control line connected to the gate electrode of the fifth transistor T5.

In an embodiment, the seventh transistor T7 may have a gate electrode connected to the scan line SLi4, a first electrode connected to the initialization line INTL, and a second electrode connected to the anode of the light emitting element LD. The seventh transistor T7 may be referred to as a light emitting element initialization transistor.

In an embodiment, a first electrode of the storage capacitor Cst may be connected to the first power line ELVDDL, and a second electrode thereof may be connected to the first node N1.

In an embodiment, the light emitting element LD may have an anode connected to the second electrode of the sixth transistor T6 and a cathode connected to the second power line ELVSSL. The light emitting element LD may be a light emitting diode. The light emitting element LD may include an organic light emitting diode, an inorganic light emitting diode, a quantum dot/well light emitting diode, and/or the like. The light emitting element LD may emit light with any one of the first color, the second color, and the third color. In addition, only one light emitting element LD may be provided in each pixel in the present embodiment, but a plurality of light emitting elements may be provided in each pixel in another embodiment. In this case, the plurality of light emitting elements may be connected in series, parallel, series-parallel, and/or the like.

In an embodiment, a first power voltage may be applied to the first power line ELVDDL, a second power voltage may be applied to the second power line ELVSSL, and an initialization voltage may be applied to the initialization line INTL. For example, the first power voltage may be higher than the second power voltage. For example, the initialization voltage may be equal to or higher than the second power supply voltage. For example, the initialization voltage may correspond to a data signal having the lowest voltage of data signals capable of being provided. For another example, the initialization voltage may be lower than voltages of data signals capable of being provided.

Figure 13:
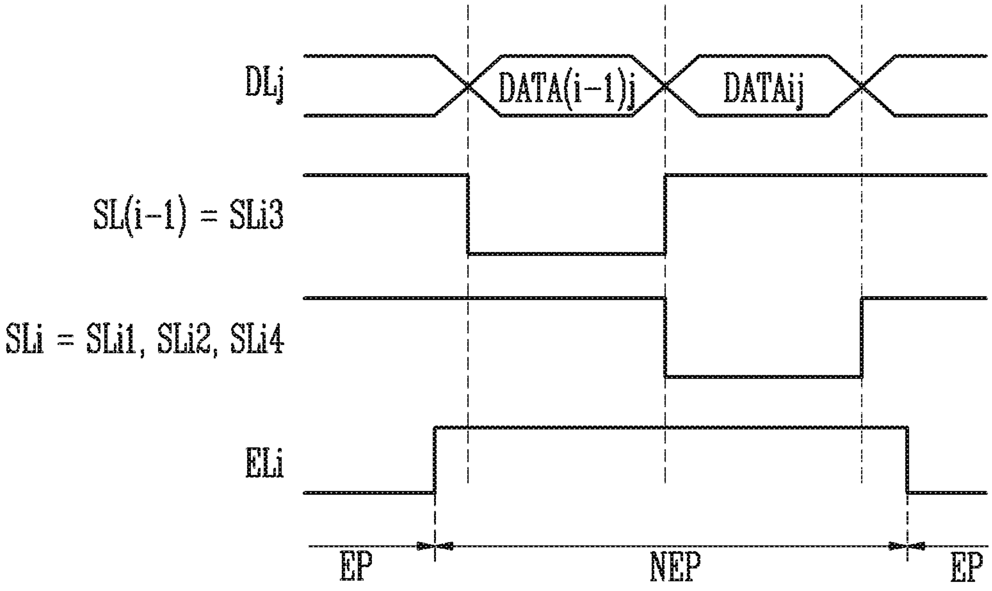
FIG. 13 is a graph illustrating a driving method for the pixel shown in FIG. 12, according to an embodiment.

FIG. 13 is a graph illustrating an embodiment of a driving method of the pixel shown in FIG. 12.

Hereinafter, in an embodiment, for convenience of description, it is assumed that the scan lines SLi1, SLi2, and SLi4 are the i-th scan line SLi and the scan line SLi3 is the i−1-th scan line SL(i−1). However, connection relationships between the scan lines SLi1, SLi2, SLi3, and SLi4 may change according to embodiments. For example, the scan line SLi4 may be an i−1-th scan line or an i+1-th scan line.

First, in an embodiment, a light emitting control signal of a turn-off level (i.e., a logic high level) may be applied to the i-th light emitting control line ELi, and a data signal DATA(i−1)j for the i−1-th pixel may be applied to the data line DLj, and a scan signal of a turn-on level (i.e., a logic low level) may be applied to the scan line SLi3. The high and/or low of the logic level may change depending on whether the transistor is a P-type or an N-type.

At this time, in an embodiment, since a scan signal of the turn-off level may be applied to the scan lines SLi1 and SLi2, the second transistor T2 may be in a turn-off state, and the data signal DATA(i−1)j for the i−1-th pixel may be prevented from entering the pixel PXij.

At this time, in an embodiment, since the fourth transistor T4 may be in a turn-on state, the first node N1 may be connected to the initialization line INTL, and the voltage of the first node N1 may be initialized. Since the light emitting control signal of a turn-off level is applied to the light emitting control line ELi, the transistors T5 and T6 may be in a turn-off state, and the unnecessary emission of the light emitting element LD due to the application of the initialization voltage may be prevented.

Next, in an embodiment, the data signal DATAij for the i-th pixel PXij may be applied to the data line DLj, and the scan signal of the turn-on level may be applied to the scan lines SLi1 and SLi2. Accordingly, the transistors T2, T1, and T3 may be in a conductive state, and the data line DLj and the first node N1 may be electrically connected. Accordingly, a compensation voltage obtained by subtracting the threshold voltage of the first transistor T1 from the data signal DATAij may be applied to the second electrode (i.e., the first node N1) of the storage capacitor Cst, and the storage capacitor Cst may maintain a voltage corresponding to a difference between the first power voltage and the compensation voltage. This period may be referred to as a threshold voltage compensation period or a data writing period.

In addition, in an embodiment, when the scan line SLi4 is the i-th scan line, since the seventh transistor T7 is in a turn-on state, the anode of the light emitting element LD may be connected to the initialization line INTL, and the light emitting element LD may be initialized to a charge amount corresponding to a voltage difference between the initialization voltage and the second power voltage.

Thereafter, in an embodiment, as the light emitting control signal of the turn-on level is applied to the i-th light emitting control line ELi, the transistors T5 and T6 may become conductive. Therefore, a current path connecting the first power line ELVDDL, the fifth transistor T5, the first transistor T1, the sixth transistor T6, the light emitting element LD, and the second power line ELVSSL may be formed.

In an embodiment, the amount of driving current flowing through the first electrode and the second electrode of the first transistor T1 may be adjusted depending on the voltage maintained in the storage capacitor Cst. The light emitting element LD may emit light with a luminance corresponding to the amount of driving current. The light emitting element LD may emit light until the light emitting control signal of the turn-off level is applied to the light emitting control line ELi.

In an embodiment, when the light emitting control signal is at the turn-on level, pixels receiving the corresponding light emitting control signal may be in a display state. Accordingly, the period in which the light emitting control signal is at the turn-on level may be referred to as an emission period EP (or an emission permitted period). Also, when the light emitting control signal is at the turn-off level, pixels receiving the corresponding light emitting control signal may be in a non-display state. Accordingly, a period in which the light emitting control signal is at the turn-off level may be referred to as a non-emission period NEP (or an emission unpermitted period).

In an embodiment, the non-emission period NEP described in FIG. 13 may be to prevent the pixel PXij from emitting light with an undesirable luminance while passing through the initialization period and the data writing period.

In an embodiment, one or more non-emission periods NEP may be additionally provided while the data signal written in the pixel PXij may be maintained (e.g., during one frame period). This may be to effectively express a low gradation by reducing the emission period EP of the pixel PXij and/or to smoothly blur the motion of an image.

Although the above has been described with reference to the embodiments of the present disclosure, those skilled in the art will understand that various modifications and changes can be made to the present disclosure without departing from the spirit and scope of the present disclosure as set forth in the claims. The embodiments disclosed and illustrated in the drawings are provided as particular examples for more easily explaining the technical contents according to the disclosure and helping understand the embodiments of the disclosure, but not intended to limit the scope of the embodiments. Accordingly, the scope of the various embodiments of the present disclosure should be interpreted to include, in addition to the embodiments disclosed herein, all alterations or modifications derived from the technical ideas of the various embodiments of the present disclosure. Moreover, the embodiments or parts of the embodiments may be combined in whole or in part without departing from the scope of the invention.

What is claimed is:

1. An electronic device comprising:

a processor, and a spread spectrum clock generator which generates an output clock signal using an input clock signal, wherein the spread spectrum clock generator generates the output clock signal at a predetermined time interval using a different spread spectrum method at the predetermined time interval, wherein the spread spectrum clock generator alternately changes the spread spectrum method from an up-spread method to a down-spread method or from the down-spread method to the up-spread method based on at least one frame period.

2. The electronic device of claim 1, wherein the spread spectrum clock generator generates the output clock signal using an up-spread method or a down-spread method.

3. The electronic device of claim 1, wherein the spread spectrum clock generator includes a phase frequency detector that receives the input clock signal and a divided clock signal, and outputs a phase frequency signal representing a phase difference and a frequency difference between the input clock signal and the divided clock signal;

a charge pump which receives the phase frequency signal and outputs a voltage or current corresponding to the phase frequency signal;

a loop filter that filters the voltage or current;

a profile register that stores the spread spectrum method, a spread ratio, and the predetermined time interval;

a modulator that modulates a voltage supplied to the loop filter in response to the spread spectrum method, the spread ratio, and the predetermined time interval; and a voltage controlled oscillator that generates a frequency-modulated output clock signal using the voltage modulated by the modulator.

4. The electronic device of claim 3, wherein the spread spectrum clock generator further includes a divider which generates the divided clock signal by dividing the output clock signal.

5. The electronic device of claim 3, wherein the spread spectrum method stored in the profile register includes an up-spread method and a down-spread method.

6. The electronic device of claim 5, wherein the modulator changes the spread spectrum method to an up-spread method or a down-spread method at the predetermined time interval.

7. A display device comprising:

pixels disposed to be connected to scan lines and data lines;

a data driver for supplying data signals to the data lines;

a timing controller for controlling the data driver;

a spread spectrum clock generator included in the timing controller and for generating an output clock signal, wherein the spread spectrum clock generator generates the output clock signal at a predetermined time interval using a different spread spectrum method at the predetermined time interval, wherein the spread spectrum clock generator alternately changes the spread spectrum method from an up-spread method to a down-spread method or from the down-spread method to the up-spread method based on at least one frame period.

8. The display device of claim 7, wherein the spread spectrum clock generator generates the output clock signal using an up-spread method or a down-spread method.

9. The display device of claim 7, wherein the spread spectrum clock generator includes a phase frequency detector that receives an input clock signal and a divided clock signal, and outputs a phase frequency signal representing a phase difference and a frequency difference between the input clock signal and the divided clock signal;

a charge pump that receives the phase frequency signal and outputs a voltage or current corresponding to the phase frequency signal;

a loop filter that filters the voltage or current;

a profile register that stores the spread spectrum method, a spread ratio, and the predetermined time interval;

a modulator that modulates a voltage supplied to the loop filter in response to the spread spectrum method, the spread ratio, and the predetermined time interval; and a voltage controlled oscillator that generates a frequency-modulated output clock signal using the voltage modulated by the modulator.

10. The display device of claim 9, wherein the spread spectrum clock generator further includes a divider which generates the divided clock signal by dividing the output clock signal.

11. The display device of claim 9, wherein the spread spectrum method stored in the profile register includes an up-spread method and a down-spread method.

12. The display device of claim 11, wherein the modulator changes the spread spectrum method to an up-spread method or a down-spread method at the predetermined time interval.

13. A driving method of a display device generating a spread spectrum clock signal for data transmission comprising:

generating the spread spectrum clock signal using a first spread spectrum method;

generating the spread spectrum clock signal by using a second spread spectrum method different from the first spread spectrum method after a predetermined time, wherein the predetermined time is at least one frame period, wherein the first spread spectrum method and the second spread spectrum method are alternately changed based on at least one frame period.

14. The driving method of claim 13, wherein the first spread spectrum method is an up-spread method, and the second spread spectrum method is a down-spread method.

* * * * *